United States Patent [19]

Friedman

[11] 4,074,445
[45] Feb. 21, 1978

[54] METHOD AND APPARATUS FOR CONSTRUCTING AND GRADING OBJECTIVE EXAMINATIONS

[76] Inventor: Ben Joseph Friedman, 315 E. Ninth St., New York, N.Y. 10003

[21] Appl. No.: 561,593

[22] Filed: Mar. 24, 1975

[51] Int. Cl.$^2$ .............................................. G09B 3/08
[52] U.S. Cl. .................................................. 35/48 A
[58] Field of Search ................... 35/48 A, 48 R, 9 C, 35/9 R

[56] References Cited

U.S. PATENT DOCUMENTS

| | | | |
|---|---|---|---|
| 1,644,160 | 10/1927 | Thompson | 35/48 A |
| 1,915,653 | 6/1933 | Dutton | 35/48 A |
| 2,060,308 | 11/1936 | Harding | 35/48 A |
| 3,057,082 | 10/1962 | Wellington et al. | 35/9 C |
| 3,106,784 | 10/1963 | Raley | 35/9 C |
| 3,747,229 | 7/1973 | Harte | 35/48 A |

*Primary Examiner*—John F. Pitrelli
*Attorney, Agent, or Firm*—Hubbell, Cohen, Stiefel & Gross

[57] ABSTRACT

Method and apparatus for constructing and grading objective examinations wherein the answers are recorded on answer sheets by darkening pre-selected spaces corresponding to the selected answer. A template is placed on the answer sheet, the template having pre-punched holes which yield a plurality of answer patterns depending on the template orientation. Indicia are provided for indicating the appropriate answer pattern yielded by the template in each given orientation. To construct an examination, question sheets are provided having spaces for questions and spaces for a plurality of possible answers with a disappearable or removable indicium juxtaposed adjacent the position for the correct answer. The pattern of the removable indicium on each particular question sheet blank corresponds to the pattern of holes of the template in one of its pre-determined orientations. A grading tray is also included for providing careful register between the template and the answer sheets, the grading tray and the template cooperate to provide an indication of the template orientation.

5 Claims, 8 Drawing Figures

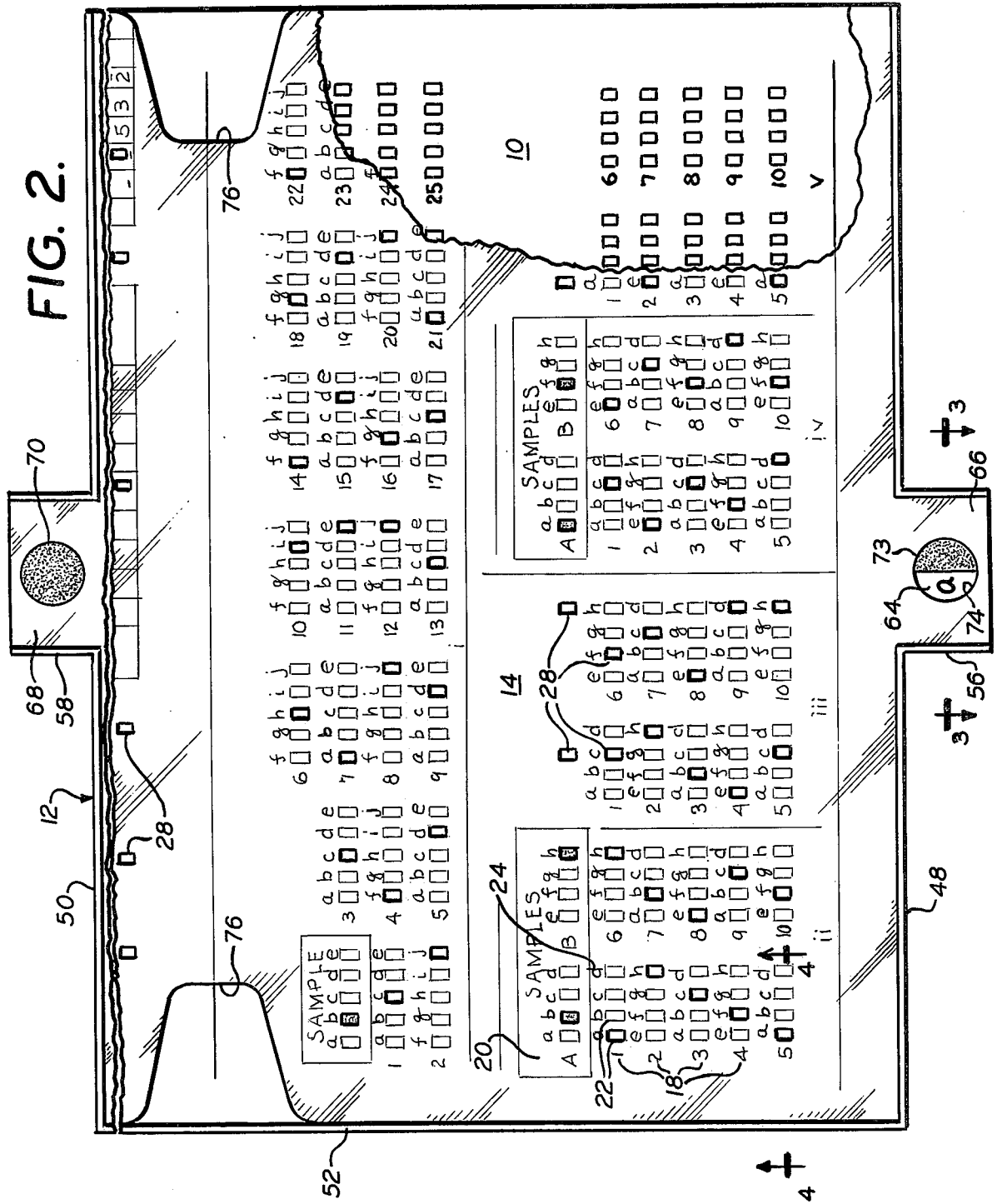
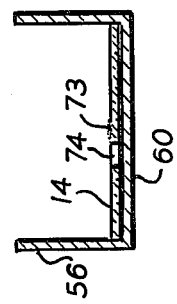

U.S. Patent    Feb. 21, 1978    Sheet 3 of 3    4,074,445
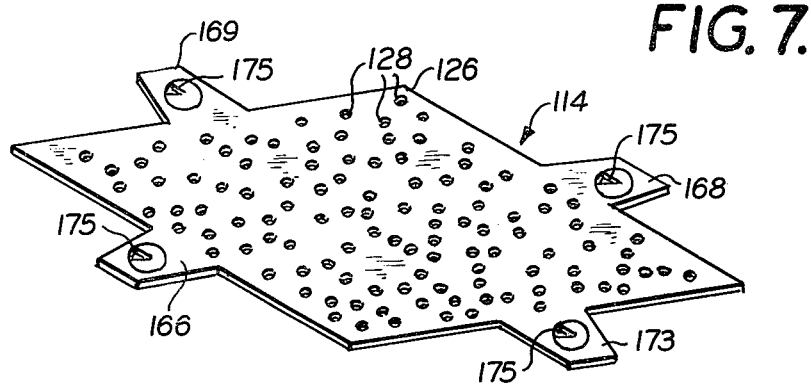
FIG. 7.
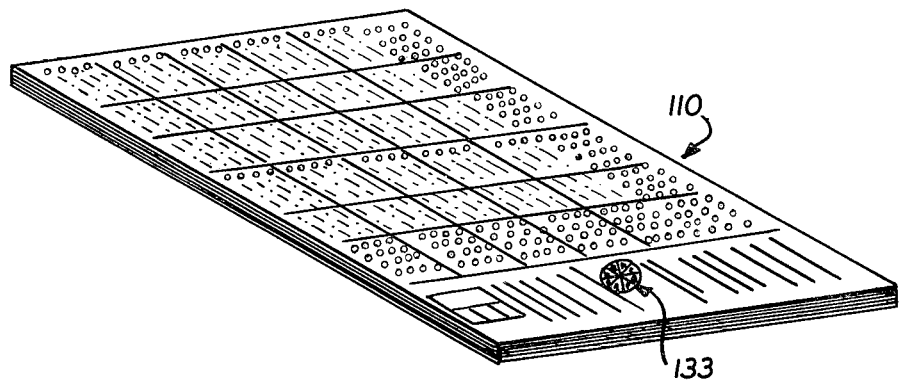
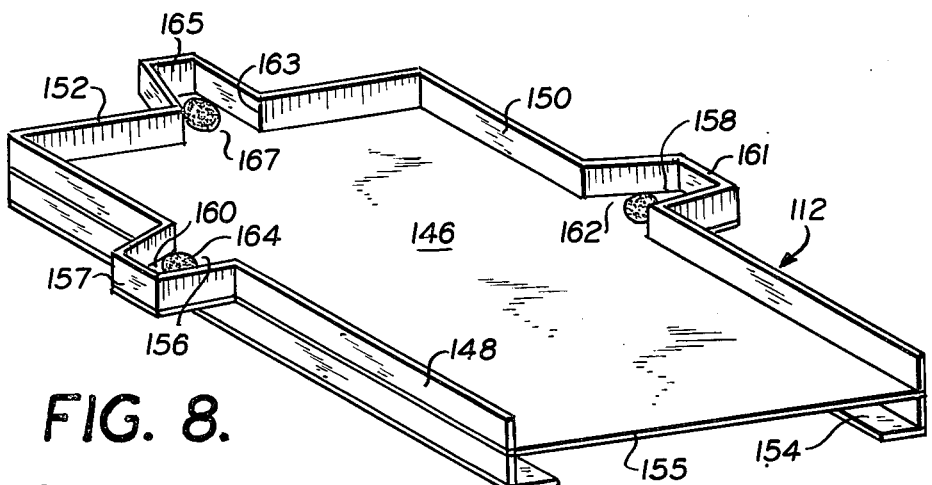
FIG. 8.
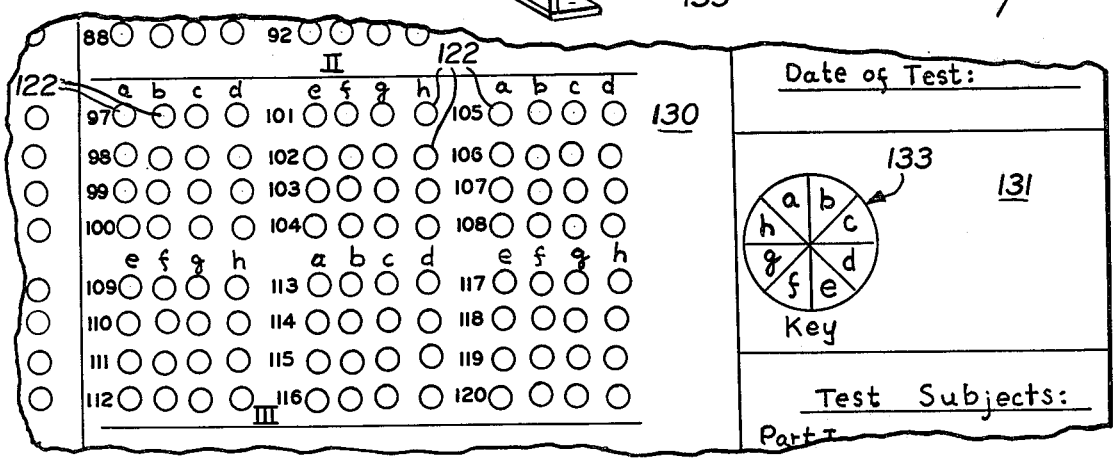

METHOD AND APPARATUS FOR CONSTRUCTING AND GRADING OBJECTIVE EXAMINATIONS

BACKGROUND OF THE INVENTION

Field of the Invention

This invention relates to a method and apparatus for constructing and grading examinations and particularly to a method and apparatus for constructing and scoring examinations of the multiple choice type. More particularly, this invention relates to a method and apparatus for constructing and scoring multiple choice examinations, especially useful for small groups of students or for individualized instruction.

SUMMARY OF THE INVENTION

Many of the most important examinations taken by students through their school years are of the objective multiple choice type. Most of these examinations provide a printed examination question sheet or booklet. Such question sheet or booklet includes after each question a group of possible answers, one of which is preferred. A separate examination answer sheet is provided which has separate areas corresponding to each of the possible answers for each question. The space corresponding to the answer preferred by the student is normally darkened, as by a pencil whereby the student answers the question. After the examination is completed, the teacher takes the answer sheets and normally has these machine scored or graded by a variety of available apparatuses.

Because of the complexity of programming the scoring or grading equipment to check a group of answer sheets, commonly such types of examinations have been administered only where large numbers of students are participating. Thus, when students are taking quizzes or tests administered for their own class of from 10 to 30 students, for example, the teachers cannot efficiently employ the techniques used on "major examinations". Instead, other simpler and more manual techniques are employed to answer and grade such classroom examinations, such as by having the students list or fill in the right answer on a question sheet or the like and then having the teacher review the marked up sheet. Multiple choice exams are rarely used because of the cumbersome aspect of preparing and scoring same. Moreover, multiple choice examinations in a digitally scored form are almost never given except in major examinations. While such simpler and more manual techniques are satisfactory for examining a student's knowledge of the subject, the student does not gain through the administration of such an examination a familiarity with the techniques employed in taking "major examinations" such as standardized elementary school reading and mathematics tests, statewide regents examinations, college aptitude and achievement examinations or the like. Thus, when a student is confronted with such a major examination, the student is apt to be disoriented by the unfamiliar technique employed for taking such an examination, which may have a significant adverse affect on the student's performance. This is especially true of students in lower grades. Often teachers are forced to resort to old major examinations to give students the desired exposure to the format and techniques for answering such examinations. In many instances this may be illegal. Currently, there is no way of familiarizing students with these techniques through regular classroom material.

The present invention relates to a method and apparatus which will enable a teacher to construct examinations for answering on answer sheets of the general type employed for the larger scale of examinations. With the present method and apparatus, a multiple choice examination for a small number of students can be consturcted and graded with no more effort than a classroom teacher commonly encounters in constructing and grading examinations by presently employed manual techniques. If desired, the student may himself grade his examination or even grade the examinations of the entire group. Nevertheless, the examination so administered will be in the general format of the "major examinations" and thereby give the student exposure to the format of and techniques for taking major examinations to thereby eliminate or reduce disorientation and apprehension encountered upon the taking of such major examinations.

To accomplish this, a master scoring template is devised, which template has pre-punched onto it a number of apertures corresponding to selected answer positions on a standard answer sheet. However, the template is selectively positionable in a number of angularly related positions and is reversible for a corresponding number of angular positions on the reverse side. Indicia indicates template position. Each of these positions yields distinctly different answer patterns when applied to a standard answer sheet, since the template aperture pattern is nonsymmetrical. Thus, for example, a standard master template can be devised which may have two opposed positions in what may be considered the upright position of the template and a corresponding two opposed positions in an upsidedown position thereof, whereby to yield four distinct positions corresponding to four distinct answer patterns when related to a standard answer sheet. Accordingly, one such template can be employed to correct examinations administered to yield answers that fall into four distinct answer patterns. Larger numbers of answer patterns may be achieved by a modified form of template, as will be described in the main body of this specification.

Examination question forms are prepared which correspond to each of the distinct answer patterns defined by the positionable template. For each question, space is provided for the question and an indicium to identify it (e.g., number of questions) and for each of the separate possible answers a space is provided which is identified by separate indicia (e.g., answer letter "a", "b", "c", or "d"). Some form of indicium is juxtaposed adjacent the answer space that is to contain the correct answer. The identification of the correct answer corresponds to the template cutout in a given template orientation.

Thus, the examination form may be employed and the teacher may insert in each of the question spaces an appropriate question and in each of the answer positions a possible answer, with the best answer placed in the position adjacent the indicium indicating that this should be the location of the best answer. Once the examination sheet is constructed to the satisfaction of the teacher, it may be duplicated by suitable duplicating means. However, the correct answer indicium on the question sheet is one that will not be reproduced by the reproducing process employed by the teacher. Thus, on the reproduced examination question sheets given to the students, the correct answer indicium will be absent. The student will take the examination and mark his answer on a standard answer sheet of the type described, which answer sheet is very similar to answer sheets commonly employed today for major examinations.

At the conclusion of the examination, the teacher will gather up the question sheets and the answer sheets and will grade the answer sheets by superimposing the template in the proper orientation over each answer sheet in succession and then determining how many answer sheet marks register with the cutouts on the master template in the selected orientation. Since there are significant numbers of different answer patters available to the teacher, it is unlikely, if not impossible, for the students to memorize the various patterns to assist them in taking classroom exams.

The invention is especially useful in connection with multiple choice examinations, an objective type of examination which is well suited for calling upon a student to employ a wide range of thinking skills such as memory, translation, analysis, synthesis, interpretation or evaluation. Moreover, it is adapted, by means in part of different forms of questioning to test all of their skills in a single examination.

The fact that a variety of tests may be developed, through this process, wherein answers are not marked on question sheets and wherein students may mark their own work afterwards can, at times, encourage the development (by teachers) of their own body of material for individualized instruction. Thus, the teacher may develop such a program relating curriculum to individualized classroom situations rather than being forced to rely on "prepacked kits" geared to a "mass audience". Moreover, the ease with which a body of multiple choice objective testing material (which relates to the daily classroom curriculum) can be developed and graded is seen as encouragement to the teacher for maximizing student exposure to this type of exam.

BRIEF DESCRIPTION OF THE DRAWINGS

In the drawings:

FIG. 2 is a top plan view of the superposed template and answer sheet in the grading tray with portions of the template broken away to more clearly illustrate the answer sheet;

FIG. 3 is a sectional view taken along the line 3—3 of FIG. 2;

FIG. 7 is a view similar to FIG. 1 showing a modified form of the present invention; and FIG. 8 is a view similar to FIG. 2, but incorporating the modification of FIG. 7.

DETAILED DESCRIPTION OF THE PREFERRED EMBODIMENTS

Figure 1:
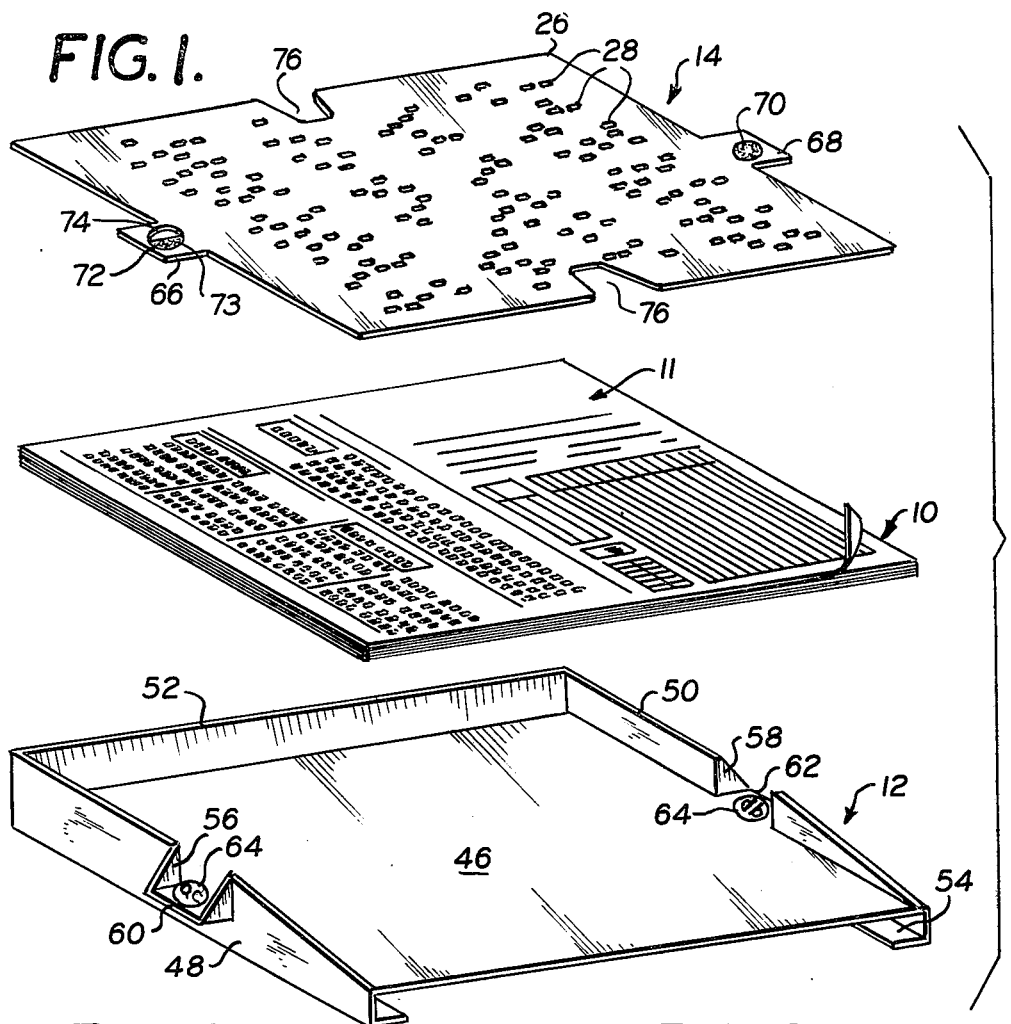
FIG. 1 is an exploded perspective view showing a grading tray, an answer sheet and a master template embodying the present invention.

Referring now to the drawings in detail and particularly to FIG. 1 thereof, a stack of answer sheets 10 is shown sandwiched between a grading tray 12 and a scoring template, sometimes referred to as a master template, 14. Each of the answer sheets 10 is provided with a plurality of question positions 18, each of which bears an indicia corresponding to the indicia of its associated question. As shown herein, the question indicia are arabic numerals 1, 2, 3 . . . etc. If sample questions are presented on the examination form, then corresponding answer positions 20 may be provided for those sample questions as well.

Associated with each question position 18 on the examination sheet 10 are a plurality of answer boxes or spaces 22, each being identified by indicium 24 (such as "a", "b", "c" or "d") which correspond to the possible answers set forth in the question sheets of the examination, as will subsequently be described. When the student selects an answer for a given question, he is instructed to darken in the box 22 which box 22 has a position on the answer sheet corresponds to the answer the student deems best.

The answer sheet 10 may also include other indicia thereon, such as indicia for identifying the student. Such indicia may be provided on one-half 11 of answer sheet 10, although it could be provided on the rear thereof. This portion is not graded, but utilizing it gives the student familiarity with filling out identifying indicia on the answer sheets for so-called major examinations.

The answer sheet 10 as above described is similar to the standard answer sheet used in major examinations and no claim is made to the answer sheet per se. The present invention is directed to a technique for utilizing the essentially standard answer sheets 10 for manual grading of a few examinations and for the structuring of those examinations without recourse to computers or the like. In accordance with the present invention, a master template 14 is provided which is preferably made out of a colored transparent material, although translucent or opague materials may be employed. A heavy clear plastic sheet is desirable. The stiffness may range from that of ordinary bond paper to a stiff sheet of cardboard, although some degree of flexibility is preferred. Moreover, the material is preferably such that it would take a relatively clean dye punch to make holes therein without significant disintegration.

It will be obvious to any skilled art worker viewing the master template 14 that, assuming the corner 26 to be the upper lefthand corner and assuming the upper surface of the template 14 to be the front thereof, punched holes 28 form one pattern of vertically extending apertures for holes in the described orientation. However, if the same surface of the template 14 is facing upward, but the template is rotated 180° so that the corner 26 is the lower righthand corner and the diagonally opposite corner is the upper lefthand corner, then, assuming the pattern of holes 28 is not symmetrical, a second hole pattern is presented by the template 14. Likewise, if the template is flipped over so that the surface facing upward in FIG. 1 is facing downward and the corner 26 is the upper righthand corner, a third hole pattern is presented and if the template is then rotated a 180° without again reversing the surfaces, still another hole pattern is presented. Thus, the single template 14 may be oriented in four separate and distinct orientations to yield four distinct and different patterns of elongated, vertically extending holes, assuming the holes are not symmetrically located on the template. Indicium may be provided on the template 14 to indicate which of the four orientations it is in. As will be seen hereinafter, cooperating indicium means on the template 14 and on the grading tray 12 is preferred for performing this function, but it will be obvious that, for example, an indicium "A" could be placed in the upper righthand corner of template 14 as viewed in FIG. 1 and an indicium "B" could be provided upsidedown in the lower left-hand corner of the face as viewed in FIG. 1 whereby the user, relying on the indicium in the upper righthand corner would know whether he is in orientation "A" or orientation "B". Likewise, indicia "C" and "D" could be put on the underside at corners 26 and in the corner diagonally therefrom for the same purpose.

Figure 5:
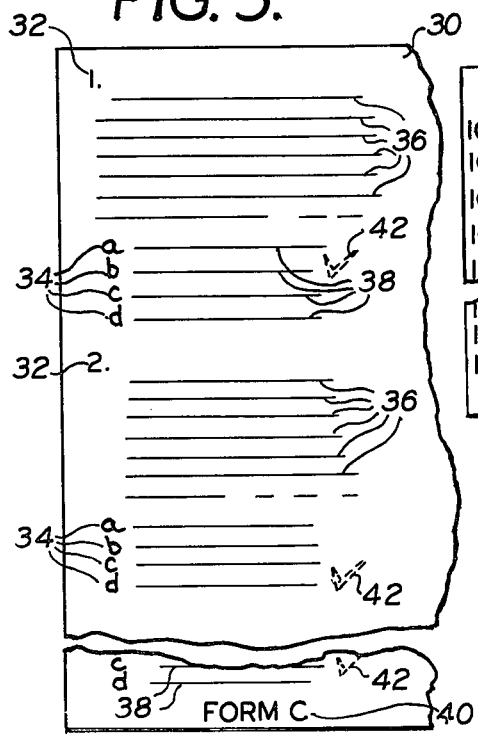
FIG. 5 is a plan view of one form of question sheet for use in practicing the present method.

In connection with the present invention, pads of examination sheet blanks are provided for use in constructing objective type examinations having an answer pattern in accordance with any of the four hole formats predetermined by the positionable template 14. Thus, for example, referring to FIG. 5, an examination multiple choice question blank 30 is shown which has printed indicia thereon including a question number 32, answer indicia 34, blank lines for writing or typing in questions, which lines are designated by the reference numeral 36 and blank lines alongside the answer indicia 34 for writing or typing a number of possible answers, here shown as four, which lines are designated by the reference character 38. Printed on the blank 30 at the bottom is some form of indicium designating the correct answer pattern, which indicium is shown by way of example as the designation "Form C" and is identified by the reference numeral 40. Finally, on the question blank 30 are indicia designating the lines 38 on which the correct answers should be placed so that the correct answers would fall into the answer pattern format that would be yielded by the template 14 being oriented in the position corresponding to the position indicia 40 at the bottom of the answer page, that is "Form C". These indicia appear on the page 30 in FIG. 5 as check marks 42. In accordance with another feature of the present invention, the check marks 42 are of such a quality of character that when the examination or question blank 30 is filled out and is then reproduced by a selected process, the indicia in the form of check marks 42 will not be reproduced by the reproduction process. Thus, a master having light blue indicia 42 can be reproduced as a Rexograph stencil with a thermographic reproduction machine commonly sold by 3-M under trademark Thermofax. The process will reproduce on the Rexograph stencil all black on the master—it will not pick up light blue check marks 42. Alternatively, a master with light yellow or very pale blue check marks 42 can be reproduced xerographically as on the machine sold by Xerox Corporation as Model 4000. The yellow and blue check marks will not reproduce. They disappear; that is they are removed through the reproduction process. Thus, the reproduced examination question sheets will not bear any indicia indicating the correct answer. This information will be left to be provided by the student on the answer sheets 10. Obviously, in the alternative, check marks 42 may be erasable before reproduction to yield unmarked copies of the filled in blank 30.

Figure 6:
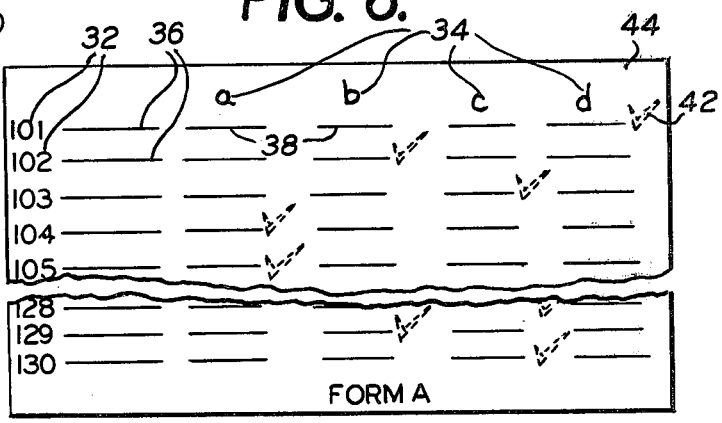
FIG. 6 is a view similar to FIG. 5 showing another form of question sheet for use in practicing the present method.
Figure 4:
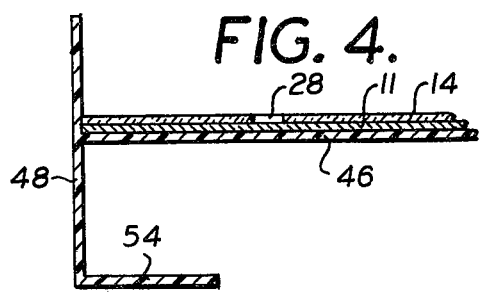
FIG. 4 is a sectional view taken along the line 4—4 of FIG. 2.

The blank sheet 30 is formatted for the type of question wherein either a relatively long question is posed on lines 36 and four possible answers thereto are provided on the lines 38 immediately thereafter or a brief reference passage is presented on some of the lines 36 followed on the remainder of lines 36 by a question relating to the passage with possible answers to such question on the lines 38 therebeneath. Other multiple choice question sheets may be provided as, for example, in the format of the sheet 44 in FIG. 6. Sheet 44 is provided with question designating indicia in the form of question numbers 32 followed by short blanks which are followed by a plurality of blanks designated "a", "b", "c" and "d". The blank 36 immediately following the question number 32 is for a single word or short phrase and the blanks 38 under the 37 "a", "b", "c" designations are also for a single word or short phrase. The sheet 44 may be employed for vocabulary examination wherein an unknown word is presented on the blank lines 36 and possible synonyms (or antonymns) are presented on the lines 38. With respect to each set of blank answer lines 38, one will have juxtaposed therewith a suitable check mark 42 to indicate the position of the correct answer for each set 38. The instructor, when using the FIG. 6 question sheet will place on the line 36 the word to be defined and will place on the blank line 38 adjacent the check mark 42 the proper synonym therefor. Then, three other words will be placed on the other lines 38 in the group, which other words are less apt as synonyms then is the word on the line 38 adjacent the check mark 42. This is repeated throughout the entire sheet 44. Again, as was true with the check mark 42 on the sheet 30, the check mark should not be reproducible by the means to be employed by the teacher in making up copies for distribution to the students during the examination.

A third standard form of multiple choice examination sheet (not shown) might have a very long column of pagewide blank lines which would provide space for a rather lengthy passage to be read by the student. Beneath the space for the passage will be spaces for brief questions about the passage, which spaces will be designated by suitable numerals 32 and blanks similar to the blanks 38 on either pages 30 and 44 will be provided for possible correct answers. Check marks 42 will be juxtaposed along the appropriate answer line 38 for each question of the designated format.

Clearly, with a method of the type described above with regard to template 14, there will be four different sets of master question sheets 30-44 which may be in all respects identical to one another, save for the location of the deletable check marks 42 thereon. Format "a" or "Form a" will have a check mark determined by the location of the holes 28 and template 14 in the "a" position, "Form b" will have check mark 42 in a pattern determined by the holes 28 on the template 14 in the "b" position, etc.

In the preferred form of administering examinations contemplated by this invention, more than one format of question sheet is commonly employed. Specifically, in the presently preferred embodiment, the examination is constructed of a number of separate question sheets for example five, and that the five sheets include at least two and preferably three different question sheet formats. Most of the potential formats lend themselves to question sheets containing about 10 questions, whereas the format for the question sheet 44 shown in FIG. 6 enables the presentation of a significantly larger number of questions, for example, about 25. Thus, if the examination is made up of four question sheets of the type designated by the reference numeral 30 and of the unillustrated type hereinbefore described and the examination includes one sheet of the format designated by the reference numeral 44, there would be 65 questions in all. Obviously, other numbers of question may be employed without departing from this invention and there is no requirement that the examination be composed of more than one sheet or that if it is, it contain question sheets of different formats.

In light of the fact that each examination preferably employes a plurality of question sheets and these question sheets include different formats of questions, it will be obvious that not only is it desirable that each type of question sheet format have different patterns of removable indicia 42 for designating correct answers, but that question sheets of different formats are arranged to provide the same answer pattern so that these may be interchanged for any given examination. This provides the instructor with significantly greater flexibility in the construction of examinations of this type. It should be noted that given such a wide latitude of choice of examination, the examination will not always contain the same number of questions. This is not unusual in multiple choice type examinations and not even in multiple choice examinations of the "major" type. All that is commonly done in such instances is to instruct the students in writing or orally to ignore the spaces on the answer sheet beyond question "X". This gives the student a further familiarity with this type of examination as such instruction is liable to be encountered when the student takes a major examination.

One of the major advantages to employing different question sheet formats in constructing any particular examination is that each format of question sheet enables a teacher to construct questions of the type calling for the student to think upon a variety of levels in answering the question. Thus, a carefully constructed multiple choice examination embodying the present invention and the concepts hereinabove and hereinafter presented can call upon a student in any given examination and in any subject to exhibit memory, translation, analysis, synthesis, interpretation, evaluation or any combination of these thinking skills. Because of this great flexibility in enabling the teacher to test such a wide variety of thinking skills over many subject areas, the teacher will be encouraged to employ the multiple choice test of the type hereindescribed which will enhance the effect of familiarizing the student with the techniques of taking such an examination, thereby further preparing him for taking major examinations.

When grading answer sheets 10, the template is placed over an answer sheet 10, the template being placed in the position yielding the appropriate answer format. The grader will then look to see if the appropriate answer boxes or spaces 22 have been darkened which can be determined by seeing if a darkened space is in register with the holes 28 on the template 14. In this connection, it will be understood that one of the reasons why it is preferred that the template 14 be transparent is that it enables the instructor while grading an examination, to pick up instances wherein a student darkened in more than one box 22 for a given answer. In that case, naturally, the student will not get credit. Naturally, if the template is opaque the grader will peruse the answer sheet before or after scoring for the possibility of the student having darkened more than one space. Also, whether the template is transparent or opaque, it is preferable that it is colored and that the markings which the student makes on the answer sheet are of the same color. This facilitates grading by providing the contrasting color of the unmarked correct answer space to appear through the template aperture. Thus, if students employ ordinary lead pencils to mark their answer sheets, the template will preferably be a transparent dark gray.

It will be recognized that in order to grade an examination answer sheet 10 as above described, the template 14 must be carefully registered relative to the answer sheet 10 being graded and must be in the appropriate orientation corresponding to the examination answer format. Means in the form of the grading tray 12 are provided to accomplish these ends and to provide temporary storage for graded examination answer sheets 10. Referring now to FIG. 1, the grading tray 12 has a main support base 46. Preferably, although not necessarily, support base 46 is spaced from the bottoms of end plates 48 and 50 and side plate 52 whereby to define a space 54 between the bottom of the base 46 and the top of the table supporting the tray 12. The perimetral extent of the base 46 is essentially congruent with answer sheets 10 and template 14, whereby to provide accurate register therebetween when they are located on the base 46. Preferably, although not necessarily, the end plates 48 and 50 are tapered from their central portion to the side of the tray 12 that does not have an end plate, that is the side of the tray 12 opposite side plates 52.

Each of the end plates 48 and 50 is provided with a cutout or notch 56 and 58, respectively, which cutout or notch has thereacross and coplanar with the base 46 an underlying horizontal tab or support 60 and 62. Preferably, the supports 60 and 62 are integral with the base 46. Appearing on the horizontal tabs or supports 60 and 62 are indicia 64. As shown in FIG. 1, the indicia 64 on the tab 60 are the letters "a" and "c" with the letter "a" to the left of the letter "c". Likewise, on the tab 62, the indicia 64 are the letters "d" and "b" with the letter "d" to the left of the letter "b". The purpose of this will become apparent hereinafter.

Provided on the template 14 at the upper and lower end thereof are tabs 66 and 68 which are proportioned to fit into the notches 56 and 58 in the end walls 48 and 50 of the grading tray 12. On the tab 68 is a darkened mark 70 which is designed to overlie the indicia 64 in register therewith when the template is positioned on the base support 46 of the grading tray 12. On the tab 66 is a second mark 72 which is designed to overlie one or the other two indicia 64 in register therewith, but not the other, whereby to expose one. The mark 72 is arranged so that its clear part 74 will expose the letter indicium 64 corresponding to the answer format for the template 14 in the position in which it rests.

That is to say, if the template 14 is in the position show in FIG. 1 and is located in the grading tray 12, the letter "a" will appear through the clear portion 74 of the mark 72. The darkened portioned 76 of the mark 72 will overlie the letter "c". Similarly, the darkened mark 70 will overlie the letters "d" and "b". Thus, only the letter "a" will appear and the grader will know that the template 14 is in its "a" position or orientation. If on the other hand, the template 14 is turned 180° without reversing the surfaces, then the clear portion 74 of the mark 72 will overlie the "b" in the indicia 64 of the tab 62 and the remaining indicia 64 on both tabs will be covered. When the template is flipped to reverse the upper and lower surfaces, it will be seen that depending upon the orientation of the template, either the letter "d" or the letter "c" will appear through the clear portion 74 of the mark 72 and all other indicia will be blanked out. In this way, appropriate orientation of the template for the particular group of answer sheets to be graded can be determined.

Preferably, the template has two side cutouts 76. These cutouts cooperate with the structure of the grading tray 12 to enable the rapid correction and removal of answer sheets. Specifically, it will be noted that there is no end wall on the grading tray opposite to the end wall 52. This enables a stack of answer sheets 10 to be similarly oriented and placed in a pile as shown in FIG. 1 and then disposed on the base support 46. Then, the template 14 is oriented to have its hold pattern conform to the pattern of correct answers on the question sheet adopted for the particular exam. The template is then placed in overlying relation with the uppermost answer sheet 10 in the stack with the tabs 66 and 68 registered in the cutouts 60 and 62 respectively. The markings 70 will overlie the indicia 64, save for the indicia registering the clear window 74 of the marking 72. This indicia bears the same designation as the answer pattern for the question forms on which the examination questions were placed. In this way, the teacher is assured that the proper hole pattern has been registered with the examination answer sheets.

The teacher generally grades the examination by placing a red or other colored mark through the holes 28 and onto the uppermost answer sheet where such holes are not registered with the black pencil marks placed on the answer sheet 10, by the students. After the examination has been so graded, the teacher may place his or her finger in the cutout 76 adjacent the side of the grading tray 12 that has no upstanding member. While pressing on the upper examination answer sheet 10 through the cutout 76, the instructor may slide his finger outwardly away from the grading tray and thus carry the top answer sheet 10 with him. This will remove the uppermost corrected answer sheet from the template which has not been disturbed. If desired, the removed and corrected answer sheet may be placed in the space 54 beneath the base 46 and it is for this reason, as well as to facilitate the removal of a scored answer sheet, that the base 46 is preferably spaced from the bottoms of the end plates. Thus, it will be seen that with a single grading template and a single grading tray as hereinabove described, four separate examination patterns may be graded. Since the number of questions is always relatively large, of the order of about 60 to 100, the answer patterns are therefore quite complex. It is highly improbable that any student will be able to memorize four separate answer patterns. Thus, the students for all intents and purposes are presented with new examination problems each time an examination is administered on the apparatus of FIGS. 1 through 6.

Referring now to FIGS. 7 and 8, a modification of the present invention is shown. In this modification, the answer sheets are designated by the reference numeral 110, the grading tray by the reference numeral 112 and the grading template by the reference numeral 114. The template 114 is shown to be of a square configuration and the holes are preferably round rather than elongated rectangles. Square holes would be equally acceptable. The template 114 differs from the template 14 in that it may be arranged in eight separate and distinct orientations for grading answer sheets 110 rather than the four of template 14. This is accomplished by arranging the holes 128 so that, without reversing the upper and lower faces of template 114, each time the template is turned 90°, a new hole pattern is presented for grading examination answer sheets 110. Clearly, when the surfaces are reversed, an additional four grading positions are available whereby to yield eight grading positions corresponding to eight different answer patterns. If desired, although not shown, eight separate indicia can be placed on the template to designate which answer pattern is being sought for each orientation of the template.

However, the modified grading tray 112 together with template 114 provides the preferred means for indicating the orientation of the template in terms of the answer pattern presented thereby. Specifically, the base 146 of the grading tray 112 is surrounded on three sides by up standing side walls 148, 150 and 152, the side 155 being unsupported and exposed. The side walls 148, 150 and 152 extend preferably both above and below the plane of the base 146 whereby to space the base 146 above a supporting surface such as a table to leave a space 154 therebetween and to provide above the base the limiting means for holding answer sheets 110 and the template 114 in a desired registered position. Walls 148 and 150 are provided with cutouts 156 and 158 which, as shown, may be surrounded by peripheral walls 157 and 161, respectively, although the walls are not necessary. In addition, wall 152 is provided with a cutout 163 which also, as shown and preferred, is provided with a surrounding peripheral wall 165 which also is optional. The base 146 is provided with outward extensions 160, 162 and 167 which respectively fit into the areas defined by the peripheral walls 157, 161 and 165.

The template 114 is provided with four outwardly extending centrally located tabs 166, 168, 169 and 173 which are complementary to the outward extent of the base 146 in the peripheral cutout walls 157, 161 and 165, which extensions are designated 160, 162 and 167. Provided on each of the template tabs is a small V-shaped cutout 175 all of which are angularly oriented parallel to one another and preferably of an angular extent of 45°. On the base portions 160, 162 and 167 are circular indicia which are divided into eight spaces, each of 45°, which bear markings that correspond to the markings on question sheets thus indicating the answer mode for the particular examination. For example, if the question sheets 130 are designated "a" through "f", then the markings 164 bear the letters "a" through "f". The cutouts 175 selectively register with one of the markings "a" through "f" at each cutout location depending upon the orientation of the template 114 relative to the grading tray 112. At each cutout the same indicium will appear depending upon orientation. Thus, irrespective of orientation of the template, any one of the eight positions is readily determined by the cooperating cutouts 175 and the indicia on the grading tray.

The examination answer sheets 110 for the modification shown in FIGS. 7 and 8 are similar to the answer sheets 10 hereinbefore discussed, save for the fact that spaces 122 provided for the students to mark the appropriate answers being round instead of rectangular. Obviously, if the template cutouts 128 were square, then the answer spaces 122 will also preferably be square. The examination sheets are generally of a longitudinal extent that is greater than any of the legs on the template so that a portion of the answer sheet extends outwardly beyond the template in order to enable it to be grasped and slid out from under the template 114 after the answer sheet has been graded. This additional portion of the grading sheet, designated 131 in FIG. 8, may also bear the circularly arranged indicia 133 that is identical to the indicia 164 on the grading tray so that the tab that is not located in the cutouts on the grading tray will overlie the indicia 133 on the uppermost answer sheet and give yet another indication of template orientation. This is optional, but is preferred as an additional check to make sure that the template is in the proper position. To further achieve this, if desired, after the examination is administered, the teacher or student may color in that 45° portion of the indicia 133 corresponding to the answer pattern so that a positive check is obtained on each answer sheet that the template is properly oriented for the answer sheet having the necessary answer pattern thereon.

Preferably, although not necessarily, certain answer positions in the answer sheets 110 must be avoided in order to avoid two holes being in alignment on a given answer line in a particular orientation of the template. Thus, for example, if the question numbers on the answer sheet are arranged vertically in groups of four, and the possible answer spaces are in the same group of four horizontally spaced areas designated "a" through "d" no two questions may have an answer designated by the same letter. Clearly other answer sheet presentations may be employed which of course will reflect themselves in changes in both question sheets and template. For example, five multiple choices may be employed with each question in which event the answer sheet will be arranged in five by five arrays of spaces. Nonsquare arrays, such as four-by-six for example may also be employed. In such an instance, it would be preferable to print on each answer sheet a colored band which matches the color of the template so that upon scoring, template holes 128 not registering or even potentially registering with spaces 122 will register with the colored bands and thus not present the visual impact of a wrong answer.

It will be obvious from the description of FIGS. 1 through 6 how the modification of FIGS. 7 and 8 should be employed. Clearly, instead of four separate sets of question sheet blanks having different answer patterns being employed in this modification, there will be eight. Apart from that, the matter of constructing the examination including utilizing the disappearing check marks to indicate the location of the correct answer while constructing the master examination question sheet will be identical to that hereinbefore described.

Moreover, it will be apparent that other forms of answer sheets, grading trays and templates may be employed, yielding different numbers of possible answer patterns. However, most of these will yield unusual configurations which the student will not normally encounter in taking major examinations and thus will leave a residium of strangeness when the student takes a major examination which is commonly formatted similar to the formats for the examination question and answer sheets described in connection with the above two preferred forms of the invention. Thus, these other shapes are not preferred, although they clearly come within the scope of the invention.

It will be recognized that the method and apparatus hereinbefore described has a wide variety of educational applications with respect to levels of thinking tested, subject examined, and individualized learning experiences. Through the creative use of the inventions hereindescribed, the teacher may develop a series of programs relating to individualized curriculum rather than relying on pre-packed kits geared to a mass audience.

It will also be recognized that this invention may be employed in examination kits prepared by other than the teacher, but employed by the teacher in testing students' knowledge and achievement. Thus, for example, an examination publisher can prepare examinations which are keyed at particular answer patterns determined by a template 10 or 110 in the possession of the teacher. The teacher would then administer the examination as hereinbefore described and would grade it or have it graded by a paraprofessional, a student or the examiner himself, but the preparation of the examination would not be performed by the teacher. That function would be performed by some outside agency having knowledge of the hole patterns available from the template 10 or 110 in the possession of the teacher. Such use of this invention is deemed to be within the scope thereof.

Further, the same technique may be employed by a textbook manufacturer who incorporates examination on the text within the body of the textbook. The examination included within the body of the textbook will be multiple choice and will have a pattern of correct answers which are keyed to a master template in the possession of the teacher. The teacher will be informed in the teacher's copy of the textbook which orientation of the template should be employed for grading each particular textbook examination. This too will be deemed to be within the scope of this invention.

Finally, while this invention is particularly useful with multiple choice examination, it may be employed in connection with other forms of questions. Such as, for example, true-false and matching questions.

While I have herein shown and described the preferred form of the present invention and have suggested modifications thereof, other changes and modifications may be made therein within the scope of the appended claim, without departing from the spirit and scope of this invention.

What is claimed is:

1. Apparatus for scoring an examination answer sheet of the type having question indicia for designating a plurality of questions and a plurality of separately positioned answer spaces associated with each question indicia corresponding to a plurality of possible answers thereto, said apparatus comprising:

a grading tray including a base support for said answer sheet;

a template having a plurality of holes therein corresponding to predetermined answer spaces on said answer sheet representing the correct answers for said plurality of questions;

means on said base support for registering said template holes with said spaces on said answer sheet disposed on said base support, said template being variably orientable relative to said answer sheet on said base support, whereby to change the answer spaces on said answer sheet in register with said template holes;

means for indicating the orientation of said template relative to said answer sheet;

said template relative to said answer sheet and said answer sheet being rectangular and said registering means comprising an upstanding wall for engaging no more than three sides of the rectangular peripheries of said template and answer sheet;

said registering means further comprising a discontinuity in the periphery of said template and a plurality of complementary interfitting surface discontinuities in said upstanding wall.

2. The apparatus of claim 1, wherein said template is square, and said upstanding wall engages three sides thereof, and the surface discontinuities in said wall are notches in each of said three sides thereof, and the surface discontinuity in said template is an outwardly extending tab complementary to said notches.

3. The apparatus of claim 2, further comprising means on said template tab and on said tray adjacent said notches for indicating the orientation of said template relative to said tray.

4. The apparatus of claim 1, wherein said means for indicating the orientation of said template comprises indicia on an element taken from the group consisting of said base support and said answer sheet on said base support, and means on said template orientable with said template and cooperable with said indicia means for indicating said orientation of said template.

5. The apparatus of claim 4, wherein said indicia are a plurality of separate positioned indicia, one corresponding to each of said orientations, and said means on said template cooperable with said indicia is a mark for covering in each orientation all of said indicia excepting the one corresponding to the said orientation.

* * * * *